United States Patent [19]

Rozentals

[11] 4,207,659
[45] Jun. 17, 1980

[54] FORMING BEARING HOUSINGS

[75] Inventor: Alfreds Rozentals, Northboro, Mass.

[73] Assignee: Lundquist Tool & Mfg. Co., Inc., Northboro, Mass.

[21] Appl. No.: 933,282

[22] Filed: Aug. 14, 1978

[51] Int. Cl.² ............................................ B21D 53/10
[52] U.S. Cl. .............................................. 29/149.5 B
[58] Field of Search ................ 29/149.5 B, 149.5 DP, 29/149.5 R; 113/116 HH, 117

[56] References Cited

U.S. PATENT DOCUMENTS

| | | | |
|---|---|---|---|
| 1,040,274 | 10/1912 | Chambers | 113/117 |
| 1,693,748 | 12/1928 | Fiegel et al. | 29/149.5 B |
| 2,594,810 | 4/1952 | Schaub et al. | 29/149.5 R X |
| 2,724,172 | 11/1955 | Potter | 29/149.5 B |
| 2,728,975 | 1/1956 | Potter | 29/149.5 B |
| 2,892,246 | 6/1959 | Mansfield | 29/149.5 B |
| 3,969,803 | 7/1976 | McCloskey | 29/149.5 B |

*Primary Examiner*—Milton S. Mehr
*Attorney, Agent, or Firm*—Kenway & Jenney

[57] ABSTRACT

A method of forming sheet metal housing for a spherical outside diameter ball bearing by forming in a sheet metal collar an inside surface conforming to half the outside surface of the bearing, placing the bearing in the housing, and hydraulically pressing a die at a predetermined pressure on the outside of the collar to conform the rest of the collar to the bearing surface, so that a predetermined torque resistance by the resulting assembly is obtained.

9 Claims, 13 Drawing Figures

FORMING BEARING HOUSINGS

BACKGROUND OF THE INVENTION

The invention relates generally to housings for bearings, and more particularly to housings for ball bearings with spherical outside diameters. The bearing industry has long used ball bearings with spherical outside diameters in housings that allow the bearing to pivot within the housing. This is necessary to make up for any misalignment of a shaft using the bearing, which can occur from adjustments necessary during the assembly of the machine or from misalignments of the shaft that occur during the action of the machinery, such as the shaft's bending under loads. Unless the bearing can pivot within its housing in response to misalignment of the shaft, the misalignment is transferred to the bearing and bearing failure will result. The bearing cannot, however, move too loosely within its housing, or vibration and excessive wear will result.

Accordingly, it is desirable to have the bearing mounted in the housing in such a way that there exists a resistance to misalignment of the bearing in the housing, but the resistance is not great enough to stop the bearing moving in the housing in response to excessive misalignment of the shaft. In other words, the housing and bearing should have some torque resistance, but not too much. Accordingly, it can be seen that it is desirable to be able to produce some torque resistance when assembling a bearing within a housing.

Various methods are used to form housings for spherical O.D. ball bearings, but there is no inexpensive and convenient way to form housings with some predictable torque resistance. A cast iron housing with an inside surface machined to conform to the outside surface of the bearing, if the fit is accurate enough, will produce torque resistance. Such a housing, however, requires the production of two machined surfaces, one on the bearing and one on the housing, and the matching of the two. This is not easily done. Ordinarily, a trial-and-error method has to be used. A rough classification of housings and bearings by measuring the surfaces is made, but then many bearings must be tested with many housings until a reasonable torque resistance is obtained from a pair.

The use of materials such as sheet metal to form housings for ball bearings has not generally been successful because of the traditional construction of such housings by building them from two or more components. Such a construction requires the painstaking alignment of the components when the housing is assembled around the bearing. Nevertheless, sheet metal is a desirable material to use in the construction of ball bearing housings because of the strength of the material, its ready availability, and its inexpensiveness.

Accordingly, it is an object of this invention to form housings for spherical O.D. ball bearings that have predictable torque characteristics.

It is another object of the invention to form such housings from readily available sheet metal, which is strong, lightweight and inexpensive.

It is still another object of the invention to form an integral sheet metal housing for spherical O.D. ball bearings with the use of common machine shop equipment.

SUMMARY OF THE INVENTION

A housing for a spherical outside diameter ball bearing is formed by forming a semi-finished housing with an open end and an inside surface having a generally cylindrical portion adjacent the open end and a portion remote from the open end that is curved to conform to substantially half of the outside curved surface of the bearing; placing the bearing in the semi-finished housing, and pressing the outside of the semi-finished housing with a controlled force to conform the inside surface to the ball bearing outside surface so that the bearing in the housing has a predetermined torque resistance.

In preferred embodiments, the housing is formed from a generally cylindrical collar of steel sheet metal and has an outward flare near the open end, the bearing is bathed in lubricant before the semi-finished housing is pressed, and the pressure is from a die mounted on a hydraulic press set with a predetermined pressure.

DESCRIPTION OF A PREFERRED EMBODIMENT

Figure 1:
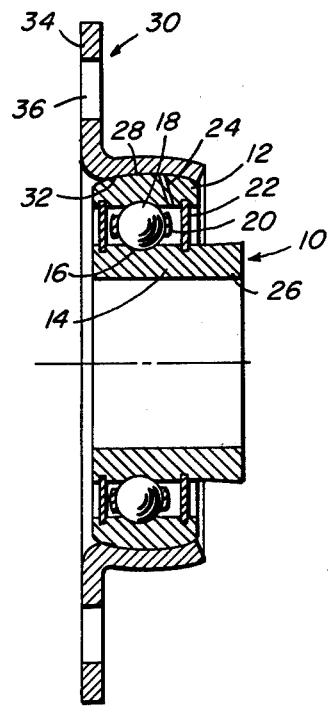
FIG. 1 is a cross-sectional view of a spherical O.D. ball bearing mounted in a housing formed by the method of the invention.

Referring now to FIG. 1, there is shown a ball bearing assembly 10 which includes an outer race ring 12 and an inner race ring 14 defining a bearing raceway 16. The raceway 16 holds balls 18. The balls 18 are retained in the raceway 16 by a retainer 20. The bearing assembly 10 further includes seal members 22.

The inner race ring 14 extends out to form an extension 26. In use, a shaft (not shown) would be positioned in the inner race ring 14 and secured there, for example, by a set screw through the extension 26. The outer surface 28 of the ball bearing 10 is curved as if it were a portion, or band, of a sphere.

The housing 30 shown is made of sheet metal and has an interior surface 32 which generally conforms to the outside surface of the bearing 10. It is a single, integral piece. The fit between the housing 30 and the bearing 10 is such that some torque is necessary to move the bearing 10 in relation to the housing 30. This requirement for some torque prevents rotational movement of the bearing assembly 10 in the housing 30, which would result in excessive wear and other deterioration of the housing and/or bearing. The torque cannot be too high, or any flexing of the shaft would be transmitted to the bearing assembly 10 and lead to its deterioration.

The housing includes a flange portion 34 with mounting holes 36. The method of forming the sheet metal housing 30 around bearing 10 conveniently and in a way that leads to relatively predictable torque resistance involves two basic procedures—the creation of a semi-finished housing from ordinary sheet metal stock and the use of controlled forces (such as in the use of hydraulic press) to fit the semi-finished housing to the bearing, using the ball bearing, in effect, as a mold. This can be done without harming the ball bearing, and is extremely effective in creating a predictable torque resistance. Any metal that can be easily blanked or formed can be used in this process for the desired housing. In the preferred embodiment, steel is used. The housing formed in the preferred embodiment of the invention described may be thought of as principally having a base portion and a substantially cylindrical drawn portion, in which the drawn portion of the housing is formed to mate with the bearing.

Each of FIGS. 2 through 6 has two parts, one a side cross section denominated A, the other a plan view denominated B.

Figure 2A:
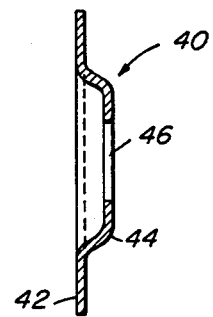
FIGS. 2–6 show the various stages in the creation of a semi-finished housing using the method of the invention.
Figure 2B:
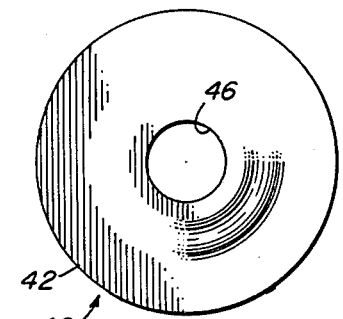
Figure 3A:
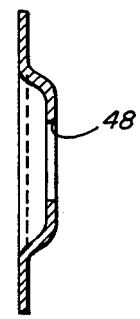
Figure 3B:
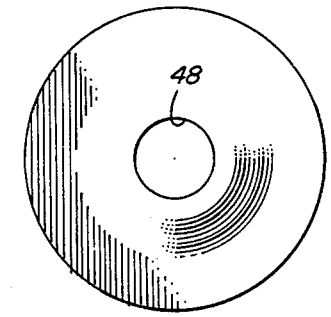

FIG. 2A shows a steel sheet metal blank 40 with which the process begins. FIG. 2B shows a plan view of the blank 40. The blank 40 appears as a disc 42 with a raised central portion 44 with a hole 46 through the center raised portion. The next step in the preferred embodiment is to shave the edges of the work piece, particularly the inside surfaces 48 of hole 46. The piece 40 would then appear as in FIGS. 3A and 3B, very similar to that shown in FIGS. 2A and 2B.

Figure 4A:
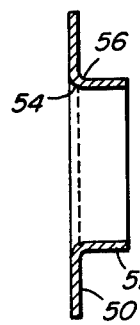
Figure 4B:
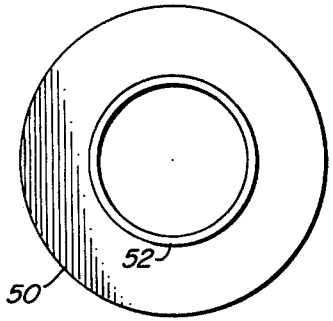

The next step in forming the semi-finished housing is to draw and strike blank 40 so that it appears as it does in FIGS. 4A and 4B. At this point, the blank 40 takes the shape of the previously mentioned base portion 50, with a cylindrical collar 52, having only small curved portions at inside and outside corners 54 and 56.

Figure 5A:
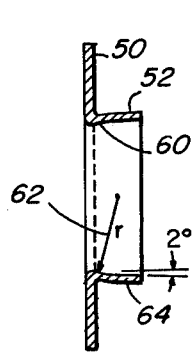
Figure 5B:
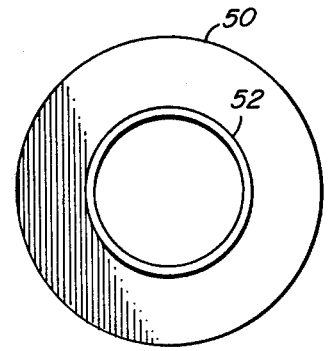

Next, the piece is formed, that is, a punch press is used with an appropriate die to form an inside surface 60 in the half of the collar portion 52 closest to the base 50 as shown in FIGS. 5A and 5B. The inside curved surface 60 in this lower half of the collar 52 has a radius r as indicated by the arrow and line 62 that corresponds to the radius of the outside spherical surface of the bearing for which the housing will be used. The forming process also gives the upper half 64 of collar portion 52 a slight outside flare, in the preferred embodiment about 2°, as shown.

The steps described as leading to the configuration of the work piece in FIGS. 4 and 5 are easily performed, and the proper dies are easily selected, when the desired configurations of the sheet metal housing as just described, are known.

Figure 6A:
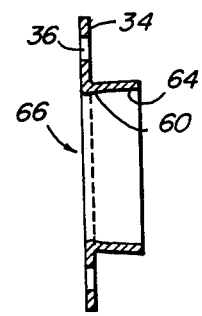
Figure 6B:
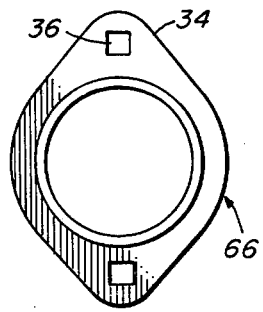

In the next step, the outer portion 50 of the piece is formed into a flange 34 with mounting holes 36 as shown in FIGS. 6A and 6B. Furthermore, the piece is cleaned and burrs are removed.

FIGS. 6A and 6B show then a semi-finished housing 66 produced with fairly routine machining processes. One half of the housing collar portion inside surface 60 generally conforms to the exterior shape of the spherical O.D. ball bearing 10 that will be placed in it. The other half of the housing collar portion inside surface 64 has a slight flare to accept the bearing 10 easily.

Figure 7:
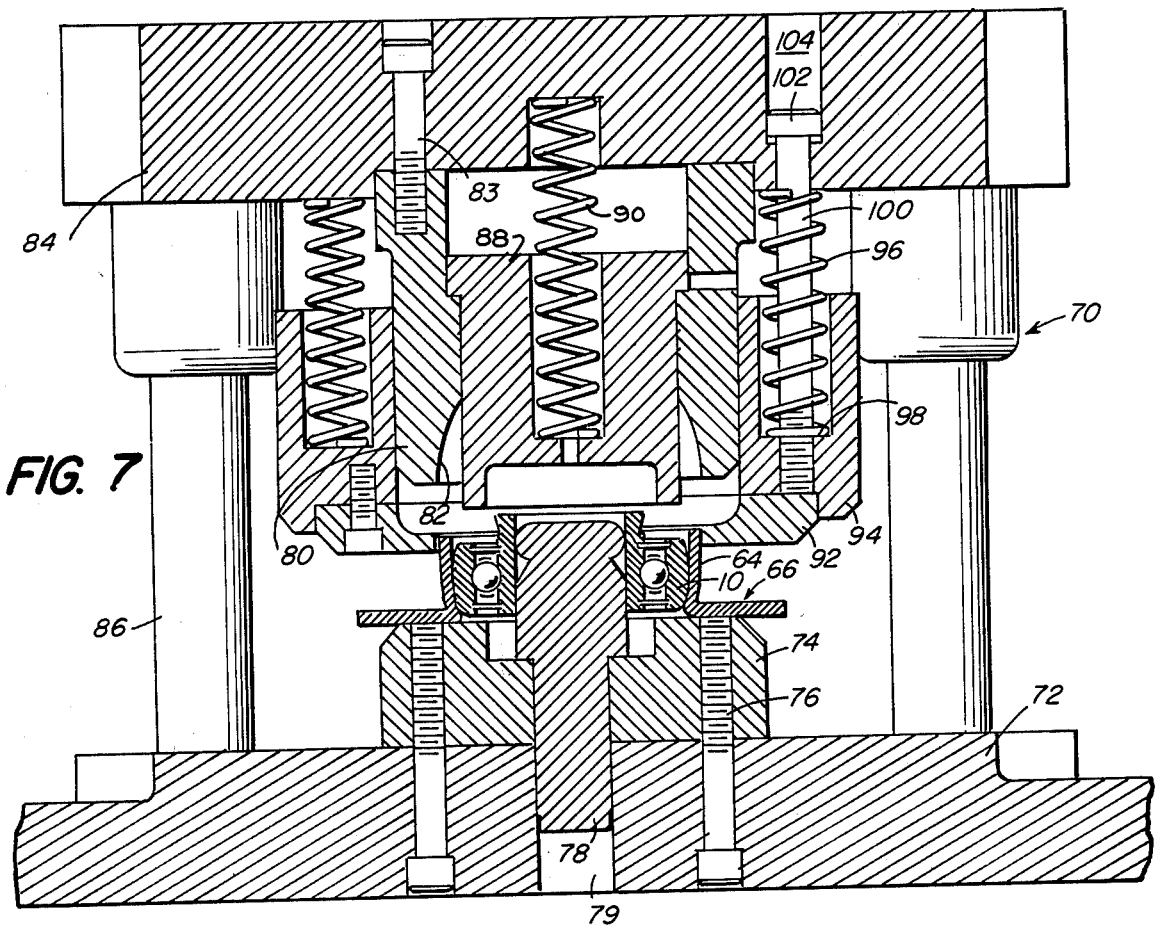
FIG. 7 is a cross-sectional view of a hydraulic press assembly and a spherical O.D. bearing in the semi-finished housing prior to the housing being struck by a die mounted in the press.

FIG. 7 illustrates the next step in this preferred embodiment of the process, in which a hydraulic press is used. FIG. 7 shows the principal elements, though not all, of a hydraulic press 70. The press 70 includes a die holder 72, on which is mounted a base plate 74. Base plate 74 is secured to die holder 72 by fasteners 76. A bearing locating pin 78 is press fit into a receiving cavity 79 in base plate 74 and die holder 72. Die holder 72 is fastened to the press bed, not shown, of the hydraulic press.

An assembly die 80 has a surface 82 calculated to conform generally to what the exterior of the upper half of the semi-finished housing 66 should look like if the housing were mated to bearing 10. The assembly die 80 is installed, via fasteners 83, to a punch holder 84. Punch holder 84, slidable on shafts 86, is fastened to the press ram, not shown, of the hydraulic press 70. A bearing positioner 88 is slidably mounted within the assembly die 80 and spring-loaded via spring 90 between the bearing positioner 88 and the punch holder 84. A pressure plate 92 is fastened to a spring retainer 94 which houses springs 96 extending from spring seats 98 to the punch holder 84. Fasteners 100 passing through some of the springs 96 and some of the spring seats 98 have heads 102 slidable in channels 104 in the punch holder 84 to retain the spring retainer 94 and pressure plate 92.

When the hydraulic system 70 is started, the press ram is sent up and brings with it the punch holder 84, assembly die 80, bearing positioner 88, and pressure plate 92 and spring retainer 94. Pressure controls are adjusted for a desired pressure of the press.

Bearing 10 is placed into the semi-finished housing 64 and this assembly is placed on the bearing locating pin 78 as shown in FIG. 7. The bearing 10 and housing 64 are bathed in a lubricant.

The press ram is then sent down. The bearing positioner 88, under spring pressure, positions the bearing 10 and housing 66 in proper alignment. As the ram continues to move down, the assembly die 80 will form the upper half 64 on the flanged housing 66 around the spherical outside surface of the ball bearing 10. As the forming takes place, spring loaded pressure plate 92 holds the flange portion 34 of the housing in a flat position. When the preset pressure of the press is reached, the press ram will return to its normal up position and the assembled bearing 10 and housing 30 can be removed from the assembly die 80.

Figure 8:
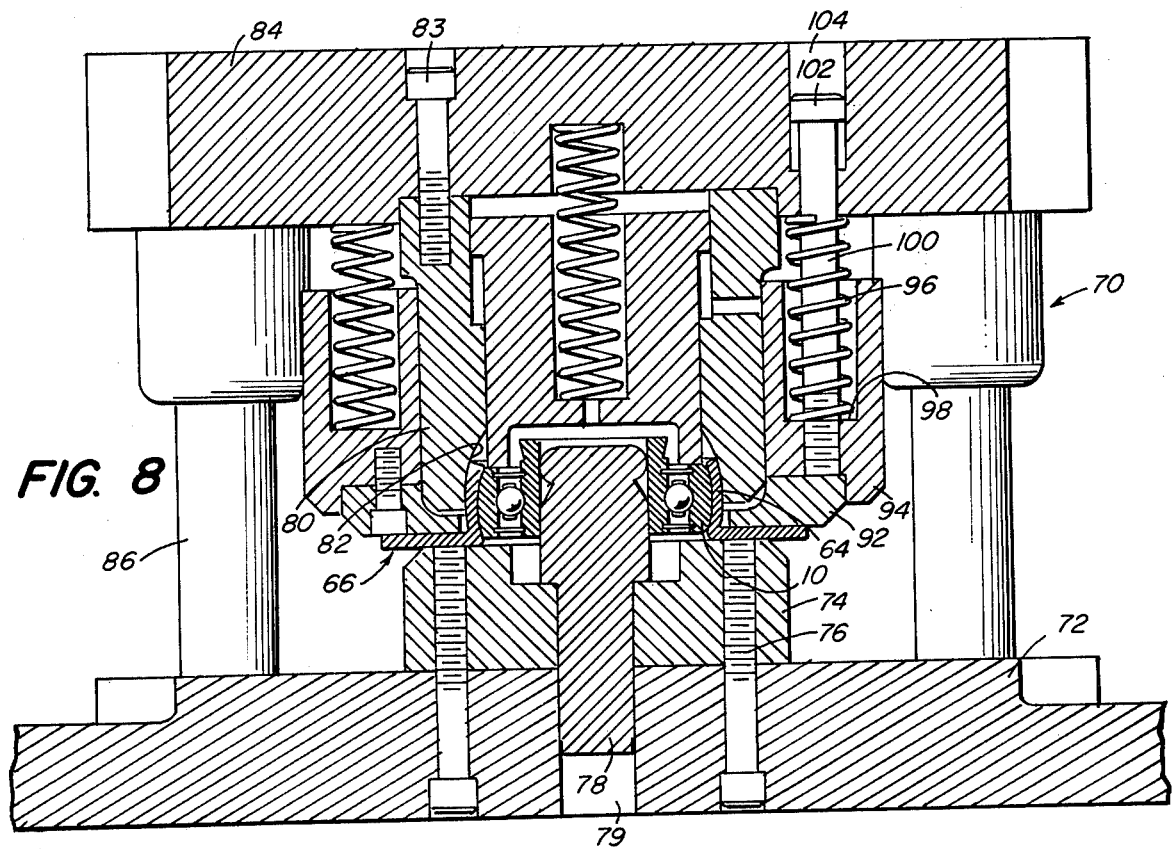
FIG. 8 is a cross-sectional view similar to that of FIG. 7 in which the die has struck the semi-finished housing to form it around the bearing.

FIG. 8 shows the housing 30 just after the assembly die 80 has completed the forming of the housing 30 around bearing 10. After the press ram is returned to its normal position and the bearing 10 and housing 30 are removed, they will appear as shown in FIG. 1. Since minor imperfections in the exterior surface of the bearing may exist, mating the housing to the bearing surface as just described may result in the bearing and housing surfaces being initially somewhat locked together. This is alleviated by "breaking loose" the components, that is, forcibly moving the bearing in the housing. Once this is done, the bearing will move within the housing at the predetermined torque.

It has been discovered that this method forms a housing around a bearing in which the torque resistance of the bearing in the housing can be reliably predicted. At some pressure of the hydraulic press, a predictable torque resistance can be achieved. After a few adjustments in the pressure, various assembled housings can be tested for torque resistance. Once a pressure is selected, however, it can be used over and over again to produce housings for bearings of a particular configuration on a regular basis. No harm to the bearing occurs using this process.

What has been shown, then, is the creation of a semi-finished housing with fairly routine punch press methods and dies, but then the use of, in effect, controlled forces in pressing a sheet metal housing onto a bearing. The use of controlled force allows the controlling of a desired characteristic of a housing and bearing assembly, namely, the torque resistance of the assembly to movement of a bearing within a housing.

With this in mind, the use of the principle of the invention to form various housings around spherical outside diameter ball bearings is apparent. The full scope of the invention is described in the following claims.

What is claimed is:

1. A method for forming a housing for a spherical outside diameter ball bearing with a predetermined torque resistance comprising:

forming a semi-finished housing having an open end and including an inside surface with a generally cylindrical portion adjacent said open end and a portion remote from said open end curved to conform to substantially half of the outside curved surface of said bearing, placing said bearing in said semi-finished housing, and pressing the outside of said semi-finished housing with a controlled force to conform said inside surface to said ball bearing outside surface so that said bearing in said housing has a predetermined torque resistance.

2. The method of claim 1 in which said housing is formed from sheet metal.

3. The method of claim 1 in which said housing is formed from sheet steel.

4. The method of claim 1 in which said generally cylindrical portion is flared outward adjacent said open end for receiving said bearing.

5. The method of claim 1 further including the step of bathing said bearing in lubricant before pressing said semi-finished housing.

6. The method of claim 1 in which said controlled force is applied to said semi-finished housing by a die mounted on a hydraulic press.

7. The method of claim 6 in which said die mounted on said hydraulic press is pressed on said semi-finished housing at a predetermined pressure.

8. The method of claim 7 further including the step of bathing said bearing in lubricant before pressing said semi-finished housing.

9. A method for forming a housing for a spherical outside diameter ball bearing with a predetermined torque resistance comprising:

forming a semi-finished sheet metal housing from a generally cylindrical collar with an open end so that substantially half the inside surface of said collar, adjacent said open end, is generally cylindrical, having however an outward flare, and substantially the other half of the inside surface of said collar, remote from said open end, is curved to conform to the outside curved surface of said bearing, placing said bearing in said semi-finished housing through said open end, bathing said bearing in lubricant, and using a hydraulic press set at a predetermined pressure to press a die against the outside of said semi-finished housing to conform said inside surface portion adjacent said open end to said ball bearing outside surface so that said bearing in said housing has a predetermined torque resistance.

* * * * *